United States Patent [19]

Robinton

[11] Patent Number: 4,688,234

[45] Date of Patent: Aug. 18, 1987

[54] APPARATUS AND METHOD FOR PRODUCING A SIGNAL-TO-NOISE RATIO FIGURE OF MERIT FOR DIGITALLY ENCODED-DATA

[75] Inventor: Michael A. Robinton, Palo Alto, Calif.

[73] Assignee: Robinton Products, Inc., Sunnyvale, Calif.

[21] Appl. No.: 747,730

[22] Filed: Jun. 21, 1985

[51] Int. Cl.[4] ............................................. H04B 3/46
[52] U.S. Cl. ..................................... 375/10; 364/481;
364/554; 328/141
[58] Field of Search ........................ 375/10, 57, 58, 99,
375/101; 455/67, 226; 364/481, 482, 483, 554;
371/28, 64; 328/130.1, 141, 144

[56] References Cited

U.S. PATENT DOCUMENTS

| | | | |
|---|---|---|---|
| 3,633,009 | 1/1972 | Green | 364/554 |
| 4,090,242 | 5/1978 | Lerma et al. | 375/10 |
| 4,185,242 | 1/1980 | Schaible | 455/226 |
| 4,207,523 | 6/1980 | Acker | 375/58 |
| 4,305,150 | 12/1981 | Richmond et al. | 375/10 |
| 4,312,044 | 1/1982 | Baba | 364/554 |
| 4,335,361 | 6/1982 | Acker | 375/10 |
| 4,384,354 | 5/1983 | Crawford et al. | 375/10 |
| 4,393,499 | 7/1983 | Evans | 455/67 |

*Primary Examiner*—Robert L. Griffin
*Assistant Examiner*—Stephen Chin
*Attorney, Agent, or Firm*—Limbach, Limbach & Sutton

[57] ABSTRACT

Apparatus and method for estimating a signal-to-noise ratio figure of merit of a received digitally-encoded binary sequence. The data sequence originates from a source which transmits the data with transitions between logic states at the source occurring only at predetermined epoch time points. The apparatus includes circuitry for producing transition signals whenever a transition is detected in the received data. Circuitry for generating reference signals from the received data indicative of the predetermined epoch time points of the transmitted data are also produced. The transition and reference signals are used to produce deviation data which represent the time difference between the transitions in the received data and the epoch time points. Typically, the reference signals are used to allocate the transition signals into deviation data groupings in accordance with the time in which the transition occurs. The deviation data groupings are then characterized to produce a figure of merit value.

28 Claims, 7 Drawing Figures

APPARATUS AND METHOD FOR PRODUCING A SIGNAL-TO-NOISE RATIO FIGURE OF MERIT FOR DIGITALLY ENCODED-DATA

TECHNICAL FIELD

The present invention relates generally to noise measurement apparatus and method and, more particularly, to an apparatus and method for estimating a signal-to-noise ratio (SNR) figure of merit for a digitally-encoded message.

BACKGROUND ART

In communication systems, it is frequently necessary to determine the quality of a communication link. An approach for producing an estimated signal-to-noise figure of merit is disclosed in J. K. Holmes, *Coherent Spread Spectrum Systems*, pp. 615–619, 1982.

The Holmes publication discloses various equations for calculating a signal-to-noise ratio estimator utilizing variables which represent the mean value of various samples taken from the data together with a value for the sample variance. The publication does not disclose the manner in which the sample mean and sample variance data can be produced in a practical, real world system.

The present invention permits a figure of merit value for a received digitally-encoded message to be readily produced utilizing components which can be easily implemented. This and other advantages of the subject invention will be apparent to those skilled in the art upon a reading the following Best Mode for Carrying Out the Invention, together with the drawings.

DISCLOSURE OF THE INVENTION

Apparatus and method for estimating a signal-to-noise ratio figure of merit of a received digitally-encoded binary data sequence are disclosed. The sequence originates from a source which transmits the data, with logic states of the data at the transmitter being changeable at predetermined epoch time points.

The apparatus includes means for receiving the data together with means for producing transition signals indicative of the times in which transitions occur in the received data. Such transition signals may, for example, be produced by a differentiation circuit which produces an output pulse whenever a transition in the data is detected. The apparatus further includes means for producing reference signals indicative of the predetermined epoch time points of the data sequence at the transmitter. A synchronous oscillator and phase detector in combination with a variable frequency source may be used for this application. In addition, it is possible to analyze the received data and generate such reference signals using correlation techniques.

The transition and reference signals are utilized to produce deviation data which are indicative of the time difference between the transitions in the received data and the epoch time points. This function may, for example, be accomplished by a series of counters which are sequentially enabled utilizing the reference signals, with the counters being incremented in response to the transition signals. Thus, at the end of a message sequence, the counters contain the deviation data. The data in each counter represents the number of transitions which occurred within a particular time interval or time range referenced with respect to the associated epoch time period. Other apparatus can also be used for performing this function.

The deviation data are then characterized and a figure of merit value is produced in accordance with such characterization which is indicative of the approximate signal-to-noise ratio of the received data sequence. In a preferred embodiment, the fiqure of merit signal is a function of the deviation data present at the outputs of a series of counters, referred as deviation counters, as set forth in the following equation $$SNRE = SNRE[DCNT(n), n = 1 - M] \quad (1)$$

where

SNRE represents the figure of merit value;
M is the number of deviation counters;
n is an index; and
DCNT(n) represents the deviation data.

BEST MODE FOR CARRYING OUT THE INVENTION

Figure 1A:
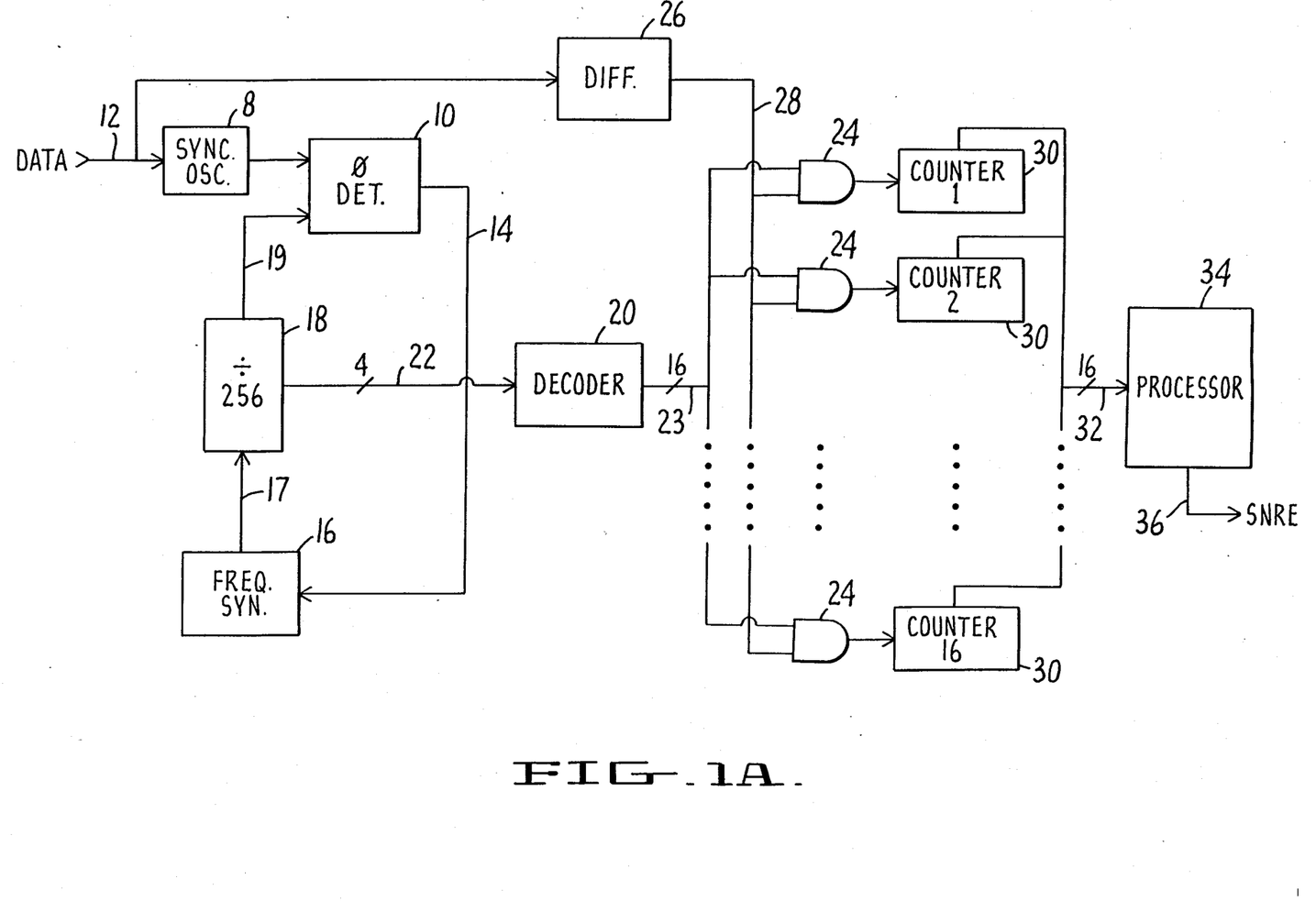
FIGS. 1A and 1B are block diagrams of a first embodiment of the subject invention.

Referring now to the drawings, FIG. 1A shows a block diagram of a first embodiment of the subject invention. A sequence of digitally-encoded messages, each being typically 220 bits in length, is received on line 12. The messages are produced by a remote transmitter and are demodulated by a receiver demodulator which is not shown. The transitions in the data at the transmitter are changeable at predetermined epoch time points. The transmitter preferably includes apparatus for ensuring that each message sequence contains a predetermined minimum number of data transitions. This may be accomplished by hashing the data, as is well known. In addition, each message contains an initial sequence of bits used for synchronization.

Line 12 is connected to the input of a conventional synchronous oscillator 8. Oscillator 8 has a nominal output frequency set equal to the pulse or data rate of the received data, with the oscillator output being phase coherent with the received data.

The digital output of oscillator 8 is coupled to one input of a conventional digital phase detector 10. The output of the phase detector is coupled to a frequency synthesizer circuit 16, as represented by line 14. As will be subsequently explained in greater detail, synthesizer 16 produces a coherent reference output signal on line 17 which has, in the present example, a frequency N times the baseband data rate of the data received on line 12. In the present example, N has a value of 256 ($2^8$), although other values of N may be used.

The output of the phase detector on line 14 is used to control the output of synthesizer 16, with the synthesizer having a nominal output of 256 times the baseband data rate. In an actual implementation of the circuit, detector 10 would usually be followed by a low pass filter. The filter and certain other conventional elements well known in the art but which do not pertain to the subject invention have been deleted so as not to obscure the true nature of the invention in unnecessary detail.

A counter or other form of frequency divider 18 is provided having a count input connected to the output of synthesizer 16 on line 17. In the present embodiment, counter 18 is an eight-stage binary counter having the Most Significant Bit (MSB) output on line 19 connected to the remaining input of phase detector 10. Thus, counter 18 provides the detector with the synthesizer output divided by 256 ($2^8$). Phase detector 10 controls synthesizer 16 such that the divider output on line 19 has an frequency equal to the baseband data rate of the received signal and a phase relationship which is fixed with respect to the epoch time points of the data at the transmitter.

A binary decoder circuit 20 is provided having four inputs which are coupled to the four Least Significant Bits (LSBs) of the eight-stage counter 18, as represented by line 22. The sixteen ($2^4$) separate decoded outputs of decoder 20 are coupled to separate respective inputs of sixteen two-input AND gates 24, as represented by line 23. The remaining inputs of the sixteen AND gates are connected together and to the output of a differentiating circuit 26. The differentiator should be implemented to trigger in a symetrical manner on the rising and falling edges of the data. The input of circuit 26 is connected to line 12 which carries the received digitally-encoded message.

The first embodiment apparatus further includes sixteen separate deivation counters 30 which are preferably eight-stage binary counters. The count input of counters 30 are connected to the respective output of the associated AND gate 24. Each counter has a reset input (not shown) which permits the counters to be reset at the beginning of each message. A conventional begin-of-message detector circuit (not shown) is used to detect the message synchronization bits of the incoming message and produce a reset pulse in response thereto.

The count outputs of deviation counters 30 are all coupled to the input of a suitably-programmed processor 34, as represented by line 32. As will be subsequently described in greater detail, processor 34 characterizes the counter outputs and produces a Signal-To-Noise Ratio Estimator (SNRE) signal on line 36.

Figure 2:
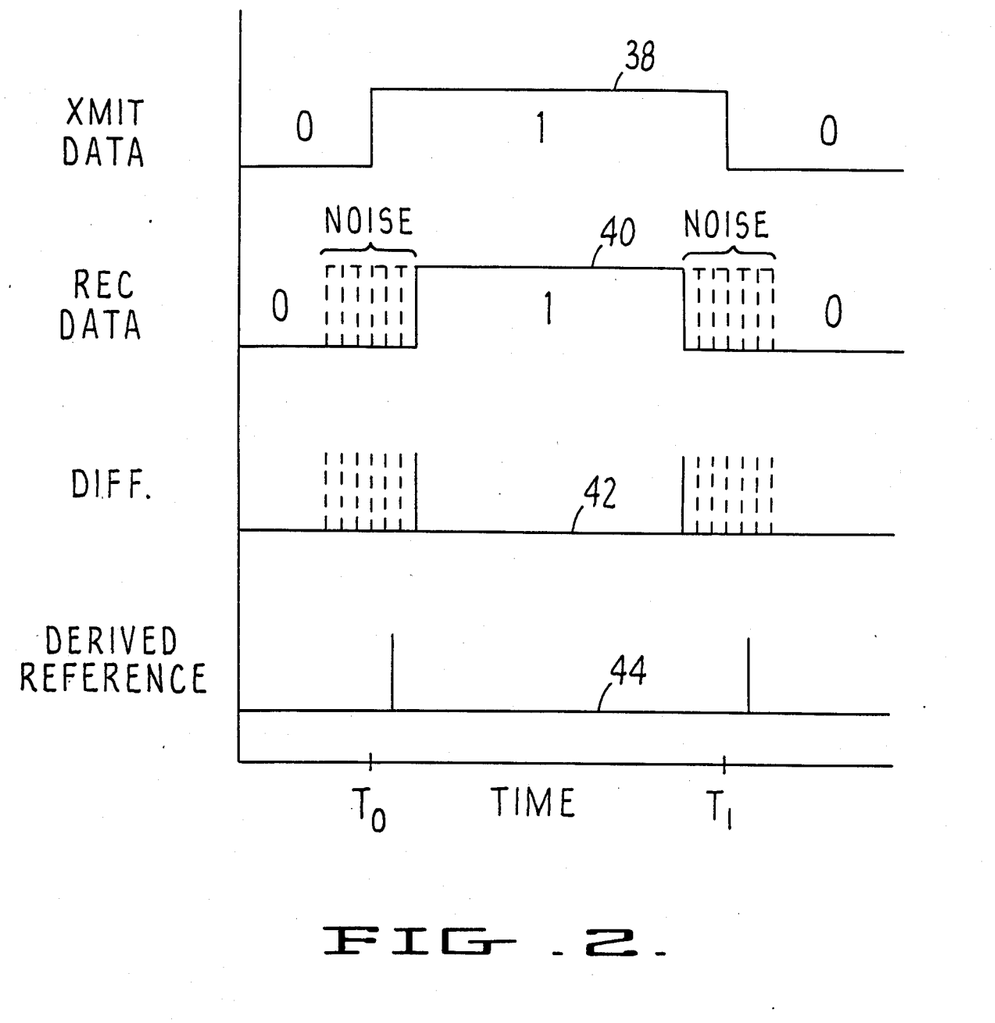
FIG. 2 is a timing diagram, showing typical waveforms produced in the various embodiments of the subject invention.

Having described the construction of the first embodiment of the subject invention, the operation of such embodiment will now be described. Referring now to FIG. 2, waveform 38 represents a short segment of a transmitted digitally-encoded data message as it appears at the transmitter. The low level portion of the waveform represents a logic "0," with the higher level portion representing a logic "1." The transmitter is implemented to permit transitions in the baseband data only at predetermined epoch times where the interval between such epoch times is fixed. Transitions between logic states in the exemplary segment appear at epoch times $T_0$ and $T_1$.

Waveform 40 represents the same segment of the transmitted data as it is received on line 12 (FIG. 1A), which is coupled to the input of oscillator 8. Noise in the data link between the transmitter and receiver is largely manifested in the form of shifts, with respect to time, in data transitions between logic states which vary from the nominal epoch times $T_0$ and $T_1$. It is assumed that the variations in data transitions are caused primarily by Gaussian noise, therefore transitions in the received data will deviate from the nominal value in a generally Gaussian manner.

Referring back to FIG. 1A, the output of phase detector 10 on line 14 carries a control signal on line 14 which varies in accordance with the phase difference between the output of oscillator 8 and the MSB output of counter 18 on line 19. The control signal on line 14 ensures that the output of synthesizer 16 is generally coherent in phase with respect to the baseband epoch time points at the transmitter. As the phrase is used here, two signals are said to be coherent in phase if the signals have a generally fixed phase relationship with respect to one another, although the signals may not necessarily be in phase.

The coherent digital output of synthesizer 16 is connected through line 17 to the count input of a divide-by-256 binary eight-stage counter. The MSB of the counter output, which is also coherent in phase with respect to the epoch times of the transmitted baseband data, has a period equal to the interval between the epoch times ($T_0$, $T_1$, etc.) of the transmitted baseband data. The logic transitions of the MSB output of counter 18 are represented by waveform 44 of FIG. 2 and serve as a derived reference.

Differentiation circuit 26 serves to produce a narrow clock pulse signal on output line 28 whenever there is either a positive or negative going transition in the received data Waveform 42 of FIG. 2 represents an exemplary output of differentiator 26 when a received data signal corresponding to waveform 40 is applied to the input. Thus, every time there is a transition in the received data between a logic "0" and a logic "1," a clock pulse will be presented to one input of each of the sixteen AND gates 24.

Decoder 20 is a conventional binary decoder having an input coupled to the four LSBs of binary counter 18 with each of the LSBs having a frequency which is a submultiple of the synthesizer output frequency. Thus, decoder 20 will sequentially produce enable signals on the sixteen ($2^4$) output lines 23 so as to sequentially enable the sixteen AND gates 24. Accordingly, the decoder 20 outputs define sixteen consecutive time intervals. When a transition in the received data occurs, a particular one of gates 24 will be enabled, depending upon the timing of the transition, so that the associated deviation counter 30 will be incremented. The particular counter incremented is indicative of the instantaneous phase deviation of the data transition from the nominal value, since the decoder outputs on line 22 are derived from the coherent output of frequency synthesizer 16.

In the absence of all noise, the timing of the transitions in the received data will remain fixed with respect to the derived reference signal represented by waveform 44 throughout the length of the message. In that event, only one of the sixteen deviation counters 30 will be incremented throughout receipt of a message. Conversely, if the received data is extremely noisy, all sixteen deviation counters will be incremented roughly the same amount. The distribution of the counts among the sixteen deviation counters 30 is indicative of the Signal-To-Noise Ratio (SNR) of the received message.

Figure 3:
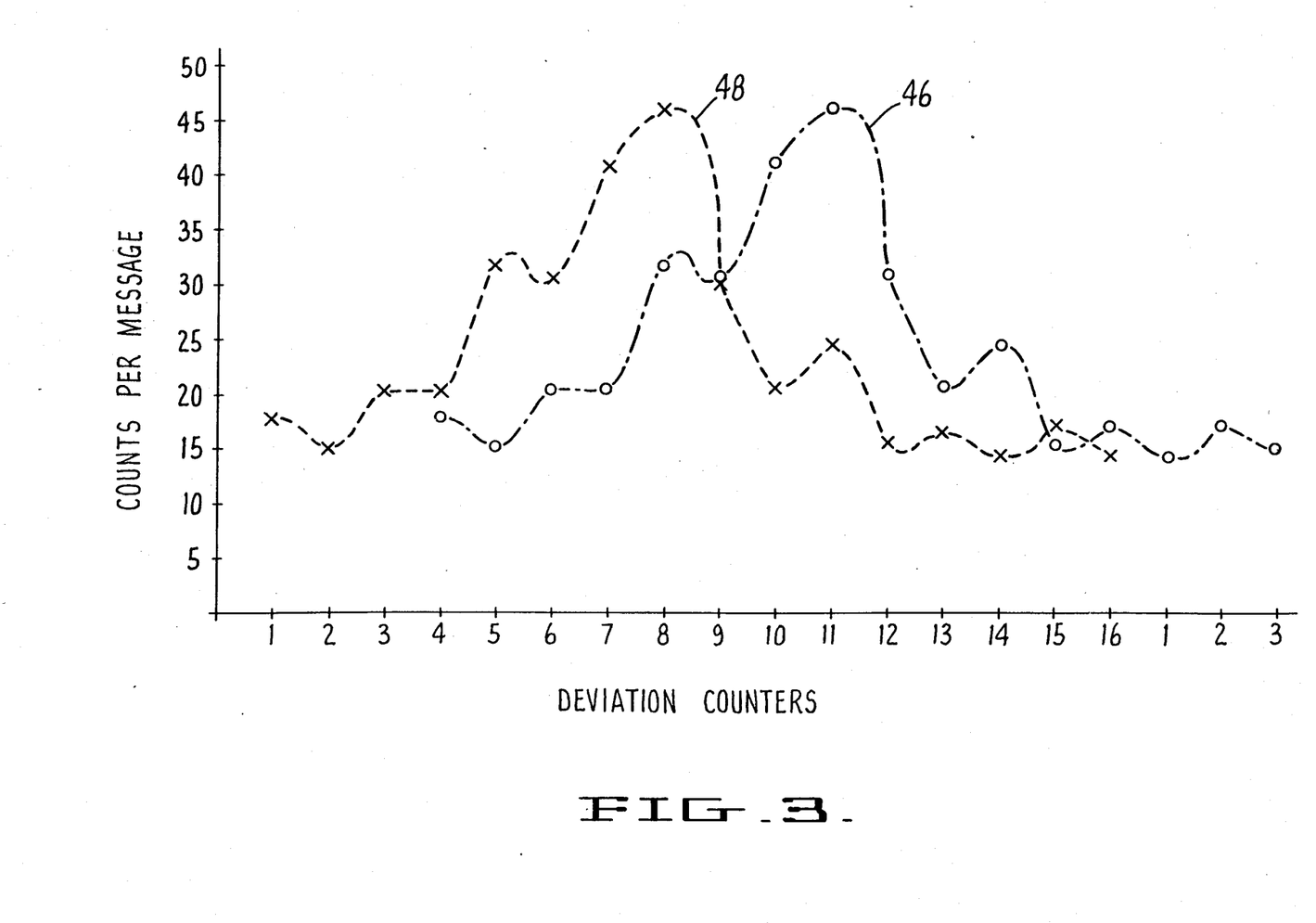
FIG. 3 is a graph depicting exemplary counter outputs of deviation counters of the first embodiment of the subject invention.

An exemplary plot of the distribution of counts among the sixteen deviation counters 30 at the end of a message is depicted in the graph of FIG. 3. The horizontal axis of the graph identifies the sixteen deviation counters, with the vertical axis representing the number of counts received by each counter during a message. As can be seen by curve 48 of FIG. 3, counter number 8 was incremented approximately 45 times during the message period, with the remaining counters being incremented to a lesser extent. In an idealized system, plot 48 would represent a Gaussian distribution around a nominal value, assuming that the noise is Gaussian and is at a reasonable level It should be noted that the absolute phase relationship between the reference signals derived from synthesizer 16 and the epoch times at the transmitter is not critical, and that it is only necessary that the reference signals be coherent in phase throughout the message with respect to the epoch times. For example, if the derived reference signals which produced the counter outputs represented by plot 48 were shifted in phase, then a counter distribution such as represented by plot 46 would result. As can be seen by comparing plots 46 and 48, plot 46 is similar to plot 48, but is shifted. As will become apparent, it is the shape of the counter distribution curve rather than the position, which determines the figure of merit value.

In the present example, only the four LSBs of counter 18 are decoded for selectively enabling M=16 counters. However, if desired, all eight stages of counter 18 could be decoded so that 256 ($2^8$) decoded outputs would be produced by decoder 20. In that event, M=256 separate AND gates and counters would be used. Accordingly, the timing of transitions in the received data with respect to the nominal or derived reference could be unambiguously determined. However, complexity is substantially reduced by decoding only the four LSBs of the eight-stage counter so that only sixteen deviation counters are required. The resolution remains the same as if all eight stages had been decoded, but since the MSBs are not decoded, there is insufficient information to uniquely identify the time at which a transition occurs between epoch time periods. Thus, it is possible that aliasing will occur for very noisy messages. However, it is likely that such a noisy message would not be usable in any event, therefore no SNRE value will be required.

Referring back to FIG. 1A, processor 34, which comprises a suitably programmed computer, receives the deviation data output of the sixteen deviation counters 30 and performs a characterization in the form of a distribution analysis to produce the SNRE signal. The magnitude of the SNRE value is preferably a function of the count outputs of the deviation counters. The value of SNRE can be expressed approximately with the following equation:

$$SNRE = SNRE[DCNT(n), n = 1 - M] \quad (2)$$

where

SNRE represents the magnitude of the figure of merit value;

M is the number of deviation counters;

n is an index; and

DCNT(n) represents the deviation data which is are the magnitude of the counts of the respective deviation counter outputs.

It has been found that a more accurate value of SNRE can be obtained by ignoring deviation counter outputs which are below a predetermined value. The following equation produces an SNRE value which accurately approximates the signal-to-noise ratio of the received message:

$$SNRE = \frac{C\left[\sum_{n=1}^{M} V(n)^2\right]}{\left[\sum_{n=1}^{M} V(n)\right]^2 L^2} + K \quad (3)$$

where

SNRE = represents the magnitude of the figure of merit value;

M = the total number of deviation counters;

n = an index;

L = the number of deviation counters having an output which exceeds a predetermined count; V(n) = the magnitude of the L number of deviation counter outputs;

K = a constant; and

C = a constant.

As previously noted, the present embodiment utilizes M = 16 number of deviation counters 30. The value V(n) represents the deviation counter outputs which are to be considered, with counters with a count below a predetermined numbering being disregarded. In the present embodiment, only counter outputs which are equal to or greater than one are considered. Given the length of the messages and the number of deviation counters 30, the value of V(n) is typically greater than 0 and usually less than 100. The value of L represents the number of deviation counters 30 having a valid count, i.e., a count equal to or greater than one.

It may be necessary to increase or decrease the minimum deviation counter output which is considered to be valid. A minimum count of one has been found to be ideal for M = 16 deviation counters and a message length of approximately 220 bits. For the same conditions, constant K is set equal to one, although it may also be necessary to adjust this value for optimum results. Constant C is a multiplication factor and is set equal to $2^{-13}$, with this value being a function of message length and the number of deviation counters.

The calculation in accordance with equation (3) yields relatively inaccurate results for values of SNRE which exceed approximately 44. Accordingly, for value of SNRE in excess of 44, the estimator value is preferrably set to 45.

Although equation (3) represents the presently preferred manner in which the deviation data are characterized for producing the SNRE value, other types of characterizations may be used for producing satisfactory results. Preferably, the SNRE value will remain a function of the ratio of the sum of the squares of the deviation data to the square of the sums of the data as set forth in the following equation:

$$SNRE = SNRE\left[\frac{\sum_{n=1}^{M} [DCNT(n)]^2}{\left[\sum_{n=1}^{M} DCNT(n)\right]^2}\right] \quad (4)$$

where

SNRE = represents the magnitude of the figure of merit value;

M is the total number of deviation counters;

n is an index; and

DCNT(n) represents the deviation data.

In some applications, it is desirable or convenient to transmit a phase-modulated signal wherein the carrier and the modulating digitally-encoded data have a fixed phase relationship with respect to one another. In that event, it is possible to derive a coherent reference signal directly from the carrier rather than from the baseband data. The reference signal can be produced utilizing the same phase detection and frequency synthesizer circuitry used in demodulating the modulated carrier signal. Elements depicted in the alternative configuration of FIG. 1B which are generally equivalent to those of the FIG. 1A configuration are designated with the same numerals.

Figure 1B:
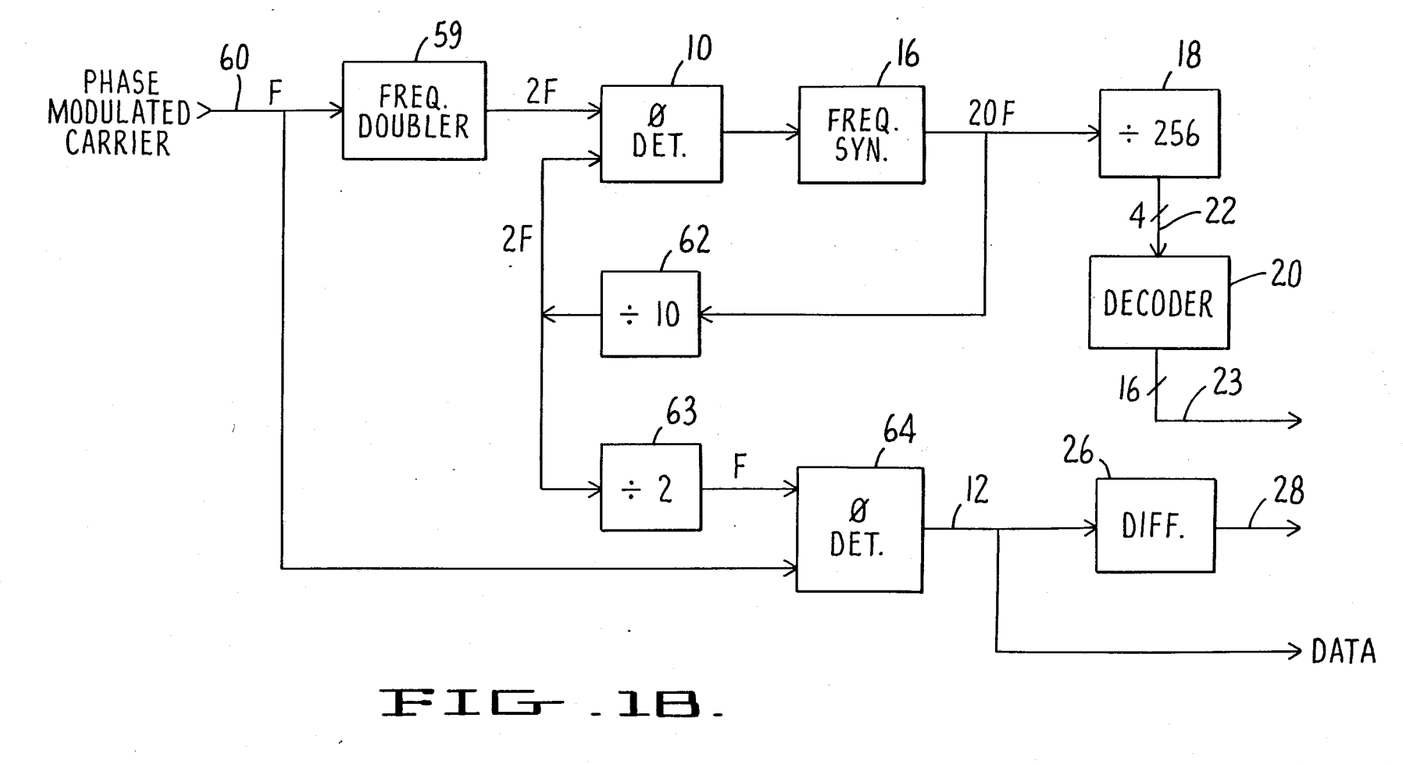

Referring now to FIG. 1B, the phase-reversal keyed (PRK) carrier, having a carrier frequency F, is received on line 60. In the present example, the carrier frequency is approximately two hundred times the baseband data rate. The modulated carrier is coupled to a conventional frequency doubler circuit 59. As is well known, a frequency doubler serves to remove the data from a PRK signal, so that the output of the doubler will be an unmodulated carrier having a frequency of 2F.

The unmodulated carrier is coupled to one input of a conventional phase detector 10. The output of detector 10 is connected to a control input of a frequency synthesizer 16 which has a nominal frequency set equal to twenty times the frequency of the received carrier.

The output of synthesizer 16 is connected to the input of a frequency divider 62 which divides the output by ten. The output of divider 62, having a frequency 2F, is connected to the second input of phase detector 10. Accordingly, detector 10 will control synthesizer 16 such that the synthesizer output will be phase locked to the incoming carrier. It can be seen that phase detector 10, synthesizer 16 and divider 62 form a frequency multiplier circuit.

The output of synthesizer 16 serves as a reference signal and is equivalent to output of synthesizer 16 of the FIG. 1A configuration. The output of the synthesizer is used both to demodulate the input signal and as a reference for determining the SNRE value of the input.

The output of synthesizer 16 is further connected to a frequency divider 18 which divides the 20F reference signal by 256. The divider is preferably in the form of an eight-stage binary counter, with the four MSBs of the counter coupled to the input of a binary decoder 20, as represented by line 22. Decoder 20 produces sixteen outputs for each epoch time interval for sequentially enabling sixteen AND gates (not shown), as will be subsequently described.

The 2F output of divider 62 is further divided to frequency F by a divide-by-two circuit 63. The reference output of circuit 63 is connected to one input of a second phase detector 64, with the remaining input of the detector being coupled to line 60 which carries the modulated signal. Detector 64 functions to demodulate the input signal, as is well known. The detected output on line 12 is fed to a differentiating circuit 26, similar to circuit 26 of the FIG. 1A configuration. Accordingly, a clock is produced on the differentiator output on line 28 every time a negative or positive transition appears in the data.

The remaining portion of the FIG. 1B circuit operates in the same manner as the FIG. 1A and is, therefore, not depicted. The differentiator output on line 28 is coupled to the input of a series of two-input AND gates similar to gates 24 of FIG. 1A. Similarly, the sixteen decoder outputs represented by line 23 are connected to the respective remaining inputs of gates 24. Given the ratio of the carrier to baseband data frequency, the resolution provided by the decoder 20 outputs is equivalent to that of the FIG. 1A configuration.

Figure 4:
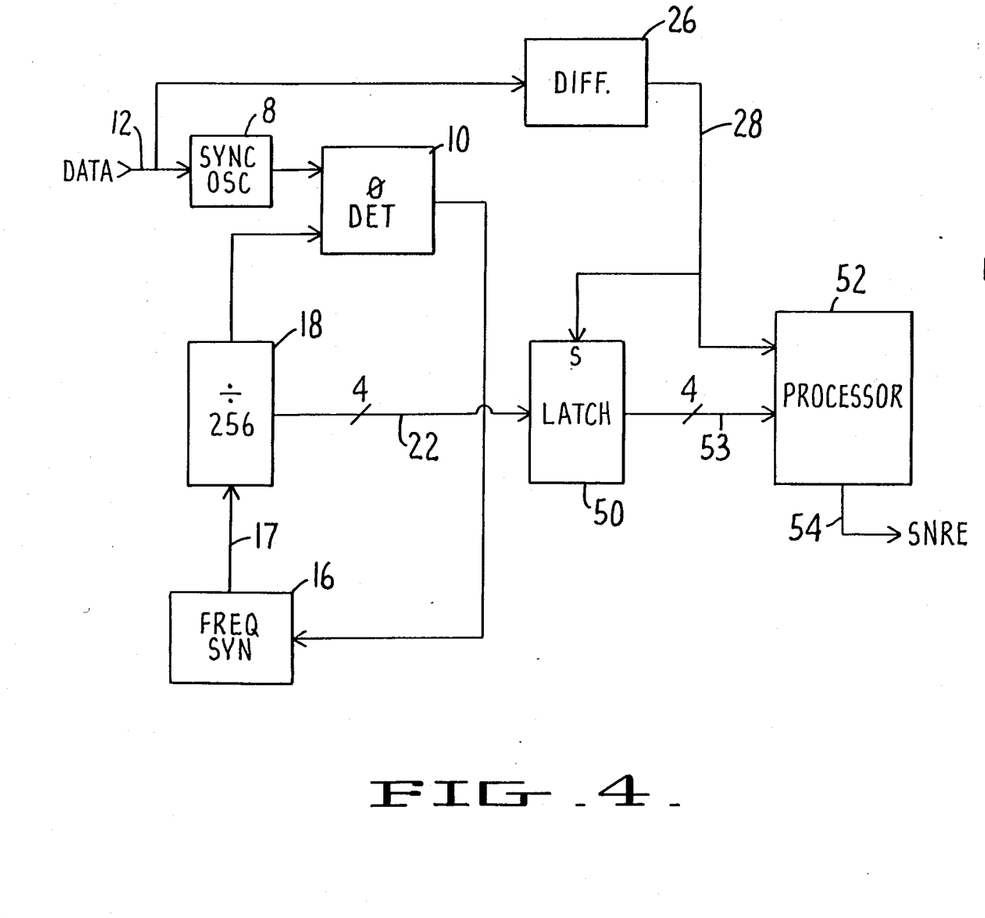
FIG. 4 is a block diagram of a second embodiment of the subject invention.

The second embodiment of the subject invention, which is depicted in FIG. 4, also includes a synchronous oscillator 8 which is controlled by the demodulated data present on line 12. Again, circuit element of the second embodiment equivalent to the first embodiment are assigned the same designation numbers. As with the case of oscillator 8 of the FIG. 1A embodiment, oscillator 8 of the present embodiment is nominally set equal to the epoch time rate of the received data. The output of oscillator 8 is connected to one input of a phase detector 10. The output of phase detector 10 is used to control a frequency synthesizer 16 which produces a coherent reference signal on line 17. The frequency of the synthesizer output is nominally set at 256 times the baseband epoch time rate, as is the case with synthesizer 16 of the FIG. 1A first embodiment.

The frequency synthesizer output is divided down to the baseband data rate utilizing an eight-stage binary counter 18. The four LSBs of counter 18 are coupled to four separate inputs of a conventional latch circuit 50, as represented by line 22. The four outputs of latch circuit 50 are coupled to the input of a processor 52, as represented by line 53.

Line 12, which carries the demodulated digitally-encoded data, is also connected to the input of a differentiating circuit 26 similar to the corresponding circuit of the FIG. 1A embodiment. The output of differentiating circuit 28 is connected to an input of processor 52 and to the set input of latch 50.

In operation, counter 18 produces coherent count output signals on lines 22 which are substantially identical to the output signals produced by the corresponding counter of the FIG. 1A embodiment. Whenever a transition takes place in the received data, differentiation circuit 26 produces a clock pulse on line 28 which causes latch 50 to store the current four LSBs of counter 18. The clock pulse further signals processor 52 via an interrupt to strobe the output of latch 50, with the latch temporarily storing the four counter outputs until the interrupt may be serviced by the processor.

The four outputs of latch 50 are used by processor 52 to address one of $M = 16$ ($2^4$) internal registers (not shown) which correspond to the sixteen deviation counters 30 of the FIG. 1A embodiment. Each time differentiation circuit 26 produces a clock pulse, the contents of the internal register associated with the decoded output are increased by one. At the end of the message, the contents of the sixteen internal registers are characterized in a manner similar to that of the first embodiment utilizing equation (3) so as to produce an SNRE signal on line 54. Prior to the beginning of the next message, the internal registers of processor 52 are reset.

Figure 6:
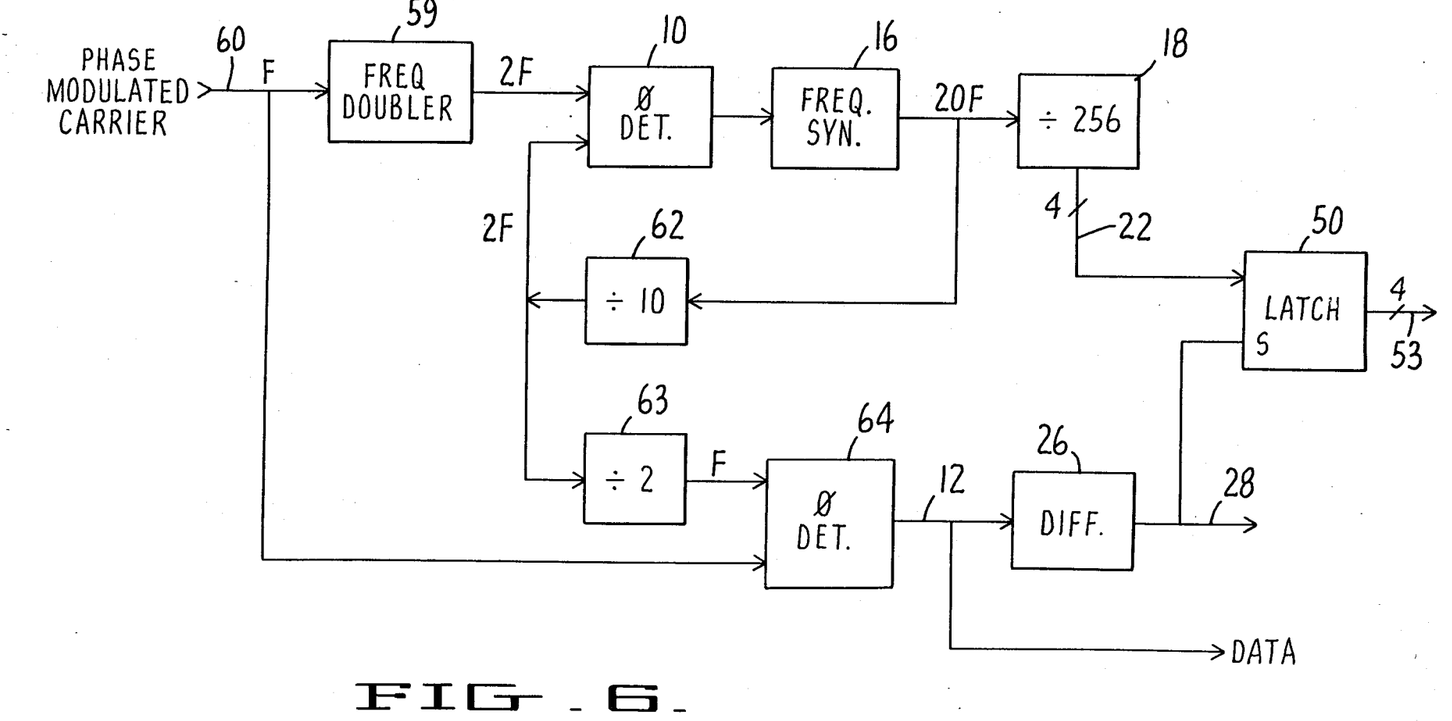
FIG. 6 is a block diagram of a modified embodiment of the subject invention, which combines features of the embodiments of FIG. 1B and FIG. 4.

It would also be possible to replace decoder 20 of the FIG. 1B embodiment with the latch 50 of the FIG. 4 embodiment. As depicted in FIG. 6, the latch would then be triggered by the output of the FIG. 1B differentiator 26. The respective components of the modified embodiment would function in the same manner as previously set forth in connection with the description of FIGS. 1B and 4, with the modified embodiment serving to both demodulate the input and provide an SNRE value.

Figure 5:
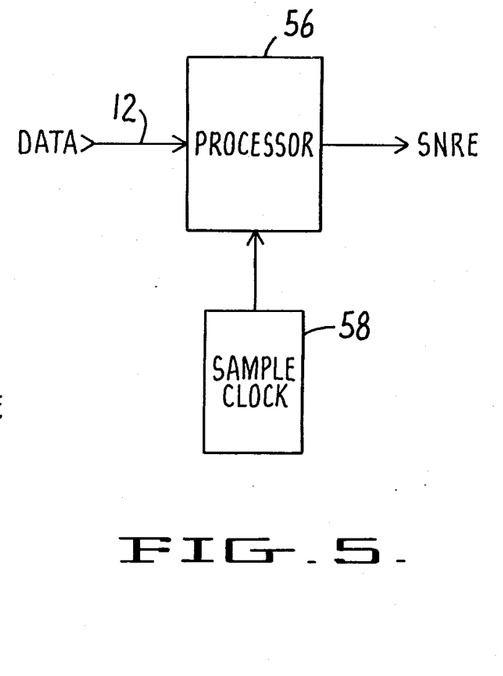
FIG. 5 is a block diagram of a third embodiment of the subject invention.

A third embodiment of the subject invention performs many of the functions of the first and second embodiments under program control. Referring now to FIG. 5, a suitably-programmed processor 56 is provided which receives the digitally-encoded messaue on line 12. A sample clock is produced by a clock circuit 58 which is also received by the processor.

Processor 56 periodically samples the received data every time a sample clock is produced by circuit 58. Each sample, which will be either a logic "1" or "0," is stored in an internal processor memory element such as a register. As will be subsequently described in greater detail, the frequency of the sample clock is relatively high with respect to the baseband data rate so that the stored samples will accurately reflect the time at which transitions in the received data have occurred.

Once an entire message has been received and stored, processor 56 produces what can be termed an idealized data sequence, by analyzinq the stored data, which matches the data at the transmitter. The idealized sequence may be produced using well-known correlation techniques wherein an initial data sequence is produced and compared with the stored data. Iterations are performed on the initial sequence until an idealized sequence is produced which most closely correlates or fits the received sequence. In producing the idealized sequence, it is assumed that transitions in the received data vary from the nominal time in a Gaussian manner. It is further assumed that the transitions are permitted only a fixed times throughout the message sequence which correspond to the epoch times at the transmitter.

Once the idealized data sequence has been produced, processor 56 proceeds to make a comparison of the time at which transitions occur in the received data and the idealized data. Transition data are then distributed and stored in separate internal registers or memory locations in accordance with the magnitude of the time difference. Typically, M=16 separate registers are used, with the registers corresponding to the sixteen deviation counters 30 of the first embodiment and the sixteen internal processor registers of the second embodiment of the subject invention. The contents of the registers are then used to produce a signal-to-noise ratio fiqure of merit estimator signal (SNRE) on line 57 in accordance with equation (3).

In order to provide the degree of accuracy equivalent to the first and second embodiments, processor 56 preferably measures the time differences between the actual and idealized transitions within one part of 256 of the baseband data rate. This can be accomplished using the equivalent of an eight-stage binary counter. As with the first and second embodiments, only the equivalent of the four LSBs of the counter are used inasmuch as the data transitions are distributed among sixteen ($2^4$) registers. The sample clock produced by circuit 58 thus preferably samples the received data at least at least 256 ($2^8$) times every baseband epoch time period.

Thus, three embodiments of the subject invention have been disclosed. Although such embodiments have been described in some detail, it is to be understood that various changes could be made by persons skilled in the art without departing from the spirit and scope of the invention as defined by the appended claims. By way of further example, it is not absolutely necessary that the local reference signal, such as the output of synthesizer 16 (FIGS. 1A, 1B and 4) be derived from the received signal. The transmitter and receiver could utilize separate precise frequency references which have a fixed phase relationship with one another. The reference at the receiver can then be utilized for controlling decoder 20 (FIGS. 1A and 1B) or latch 50 (FIG. 4).

What is claimed is:

1. Apparatus for producing an estimated signal-to-noise ratio figure of merit value for a received digitally-encoded binary data sequence wherein the data sequence originates from a source which transmits the data at a baseband data rate, with logic states of the data at the source being changeable at predetermined periodic epoch times, said apparatus comprising:

receiving means for receiving the received data;

transition means coupled to said receiving means for producing transition signals indicative of the times in which transitions occur in the received data during the sequence;

reference means for producing reference signals substantially phase coherent with respect to said predetermined epoch time points at the source of the transmitted data sequence;

deviation means responsive to said transition signals and said reference signals for producing a plurality of sets of deviation data representing the time difference between said transition in the received data and said epoch time points, with said deviation data in respective ones of said sets indicating the number of said transitions which occurred within respective ones of a plurality of consecutive time intervals; and processor means for characterizing said sets of deviation data and producing said figure of merit value indicative of the approximate signal-to-noise ratio of the received data sequence in accordance with said characterization.

2. The apparatus of claim 1 wherein said processor means produces said figure of merit value as a function of the ratio of the sum of the squares of said deviation data to the square of the sums of said deviation data in accordance with the following equation:

$$SNRE = SNRE \left[ \frac{\sum_{n=1}^{M} [DCNT(n)]^2}{\left[ \sum_{n=1}^{M} DCNT(n) \right]^2} \right]$$

where

SNRE represent the magnitude of said figure of merit value;

M represents the number of said sets of said deviation data;

n is an index; and

DCNT(n) represents said deviation data of said M number of said deviation data sets.

3. The apparatus claim 1 wherein said processor means produce said figure of merit value substantially in accordance with the following equation:

$$SNRE = \frac{C\left[\sum_{n=1}^{M} V(n)^2\right]}{\left[\sum_{n=1}^{M} V(n)\right]^2 L^2} + K$$

wherein SNRE represent said figure of merit value, C and K are constants, M is the number of said sets of said deviation data, n is an index, L is the number of said sets of said deviation data containing said deviation data which represent said number of said received data transitions exceeding a predetermined minimum value and V(n) represents the deviation data present in said L number of said sets.

4. The apparatus of claim 1 wherein said reference means produces said reference signals utilizing the received data sequence.

5. The appartus of claim 4 wherein said reference means includes frequency multiplication means for generating a phase coherent signal which is phase coherent with respect to said periodic epoch times and which has a frequency greater than said epoch time rate.

6. The apparatus of claim 5 wherein said reference means further includes frequency divider means for dividing the frequency of said phase coherent signal.

7. The apparatus of claim 6 wherein said frequency divider means includes a counter having a plurality of counter outputs.

8. The apparatus of claim 7 wherein said reference means further includes decoder means for producing said reference signals utilizing counter signals present at said counter outputs.

9. The apparatus of claim 8 wherein said frequency divider means provides N number of said reference signals during each of the baseband data periods and wherein said deviation means produces M number of said sets of said deviation data for each of said data sequences.

10. The apparatus of claim 9 wherein said number N is greater than said number M.

11. The apparatus of claim 9 wherein said reference means includes latch circuit means for storing reference data which corresponds to said N number of reference signals at times determined by said transition signals.

12. Apparatus for producing an estimated signal-to-noise ratio figure of merit value for a received digitally-encoded binary data sequence wherein the data sequence originates from a source which transmits the data at a baseband data rate, with logic states of the data at the source being changeable at predetermined periodic epoch times, said apparatus comprising:

receiving means for receiving the received data;
transition means coupled to said receiving means for producing transition signals indicative of the times in which transitions occur in the received data during the sequence;
reference means for producing reference signals substantially phase coherent with respect to said predetermined epoch time points at the source of the transmitted data sequence;
deviation means responsive to said transition signals and said reference signals for producing deviation data indicative of the magnitude of the time difference between said data transitions and said epoch time points, wherein said deviation data are allocated among a plurality of sets for each of the data sequences, with each of said sets containing deviation data indicative of a selected range of said time difference magnitudes, wherein said deviation data of a particular one of said sets represents the number of said received data transitions which occurred during the data sequence at said selected time difference range associated with said particular set; and
processor means for characterizing said deviation data and producing said figure of merit value indicative of the approximate signal-to-noise ratio of the received data sequence in accordance with said characterization, with said figure of merit value being a function of the ratio of the sum of the squares of said deviation data to the square of the sums of said deviation data in accordance with the following equation:

$$SNRE = SNRE\left[\frac{\sum_{n=1}^{M} [DCNT(n)]^2}{\left[\sum_{n=1}^{M} DCNT(n)\right]^2}\right]$$

where
SNRE represents the magnitude of said figure of merit value;
M represents the number of said sets of said deviation data;
n is an index; and
DCNT(n) represents said deviation data of said M number of said deviation data sets.

13. Apparatus for producing an estimated singal-to-noise ratio figure of merit value for a received digitally-encoded binary data sequence wherein the data sequence originates from a source which transmits the data at a baseband data rate, with logic states of the data at the source being changeable at predetermined periodic epoch times, said apparatus comprising:

receiving means for receiving the received data;
transition means coupled to said receiving means for producing transition signals indicative of the times in which transitions occur in the received data during the sequence;
reference means for producing reference signals substantially phase coherent with respect to said predetermined epoch time points at the source of the transmitted data sequence;
deviation means responsive to said transition signals and said reference signals for providing deviation data indicative of the magnitude of the time defference between said data transitions and data are allocated among a plurality of sets for each of the data sequences, with each of said sets containing deviation data indicative of a selected range of said time difference magnitudes wherein said deviation data of a particular one of said sets represents the number of said received data transitions which occurred during the data sequence at said selected time difference range associated with said particular set; and
processor means for characterizing said deviation data and producing said figure of merit value indicative of the approximate signal-to-noise ratio of the received data sequence in accordance with said characterization, with said figure of merit value being produced substantially in accordance with the following equation:

$$SNRE = \frac{C\left[\sum_{n=1}^{M} V(n)^2\right]}{\left[\sum_{n=1}^{M} V(n)\right]^2 L^2} + K$$

where SNRE represents said figure of merit value, C and K are constants, M is the number of said sets of said deviation data, n is an index, L is the number of said sets of said deviation data containing said deviation data which represent said number of said received data transitions exceeding a predetermined minimum value and V(n) represents the deviation data present in said L number of said sets.

14. Apparatus for producing an estimated signal-to-noise ratio figure of merit value for a received digitally-encoded binary data sequence wherein the data sequence originates from a source which transmits the data at a baseband data rate, with logic states of the data at the source being changeable at predetermined periodic epoch times, said apparatus comprising receiving means for receiving the received data;
transition means coupled to said receiving means for producing transition signals indicative of the times at which transitions occur in the received data sequence;
reference means for producing reference signals substantially phase coherent with respect to said predetermined epoch times, said reference means including frequency multiplication means for generating a phase coherent signal which is phase coherent with respect to said periodic epoch times and has a frequency greater than said epoch time rate and including frequency divider means for producing a plurality of frequency divided signals having a frequency which is a submultiple of said frequency of said phase coherent signal;
deviation means responsive to said transition signals and said reference signals for producing a plurality of sets of deviation data for each of the data sequences; with said deviation data of a particular one of said sets representing the number of said received data transitions which occurred during the data sequence at a predetermined time difference between said data transitions and said epoch time points; and
processor means for producing said figure of merit value from said sets of deviation data.

15. The apparatus of claim 14 wherein said reference means includes latch circuit means for receiving said plurality of frequency divided signals and for storing reference data, at times determined by said transition signals, which corresponds to said reference signals.

16. The apparatus of claim 14 wherein said frequency divider includes a counter having a plurality of counter outputs where said frequency divided signals appear and decoder means for producing said reference signals from said frequency divided signals.

17. A method for producing an estimated signal-to-noise figure of merit value of a received digitally-encoded binary data sequence wherein the data sequence originates from a source which transmits the data, with logic states of the data at the source being changeable at predetermined periodic epoch times, sAid method comprising the following steps:

receiving the transmitted data sequence;
producing transition signals indicative of the times in which transition occur in the received data during the sequence;
producing reference signals substantially phase coherent with respect to said predetermined epoch times point of the transmitted data sequence;
producing a plurality of sets of deviation data indicative of the time difference between said transitions in the received data and said epoch time points utilizing said transition signal and said reference signals, with said deviation data in respective ones of said sets representing the number of said transitions which occurred within respective ones of a plurality of consecutive time intervals; and
producing said figure of merit value by characterizing said groups of deviation data.

18. The method of claim 17 wherein said figure of merit value is produced with such value being a function of the ratio of the sum of the squares of said deviation data to the square of the sums of said deviation data in accordance with following equation:

$$SNRE = SNRE\left[\frac{\sum_{n=1}^{M} [DCNT(n)]^2}{\left[\sum_{n=1}^{M} DCNT(n)\right]^2}\right]$$

where
SNRE represents said figure of merit value;
M represents the number of said sets of said deviation data;
DCNT(n)
n is an index; and represents said deviation data of said M number of said deviation data sets.

19. A method for producing an estimated signal-to-noise ratio figure of merit value of a received digitally-encoded binary data sequence wherein the data sequence originated from a source which transmits the data with logic states of the data to the source being changeable at predetermined periodic epoch times, said method comprising the following steps:

receiving the transmitted data sequence;
producing transition signals indicative of the times in which transitions occur in the received data during the sequence;
producing reference signals substantially phase coherent with respect to said predetermined epoch time points of the transmitted data sequence;
producing deviation data indicative of the time difference between said transitions in the received data and said epoch time points utilizing said transition signals and said reference signals, with said deviation data being separated into a plurality of sets of said deviation data, with said deviation data of a particular one of said sets representing the number of said received data transitions which occurred during the data sequence at a particular time interval with respect to said epoch time points; and
producing said figure of merit value by characterizing said deviation data, with such value being a function of the ratio of the sum of the squares of said deviation data to the square of the sums of said deviation data in accordance with the following equation:

$$SNRE = SNRE \left[ \frac{\sum_{n=1}^{M} [DCNT(n)]^2}{\left[ \sum_{n=1}^{M} DCNT(n) \right]^2} \right]$$

where
SNRE represents said figure of merit value;
M represents the number of said sets of said deviation data;
n is an index; and
DCNT(n) represents said deviation data of said M number of said deviation data sets.

20. Apparatus for producing an estimated signal-to-noise ratio figure of merit value for a received digitally-encoded binary data sequence wherein the data sequence originates from a source which transmits the data at a baseband data rate, with logic states of the data at the source being changeable at predetermined periodic epoch times, said apparatus comprising:
receiving means for receiving the received data;
transition means coupled to said receiving means for producing transition signals indicative of the times in which transitions occur in the received data during the sequence;
reference mans for producing reference signals, utilizing the received data sequence, which are substantially phase coherent with respect to said predetermined epoch time points at the source of the transmitted data sequence, said reference mans including frequency multiplication means for generating a phase coherent signal which is phase coherent with respect to said periodic epoch times and which has a frequency greater than said eposh time rate;
deviation means responsive to said transition signals and said reference signals for producing deviation data representing the time difference between said transitions in the received data and said epoch time points; and
processor means for characterizing said deviation data and producing said figure of merit value indicative of the approximate signal-to-noise ratio of the reeeived data sequence in accordance with said characterization.

21. The apparatus of claim 20 wherein said deviation data are indicative of the magnitude of said time difference between said data transitions and said epoch time points and wherein said deviation data are allocated among a plurality of sets for each of the data sequences, with each of said sets containing deviation data indicative of a selected range of said time difference magnitudes wherein said deviation data of a particular one of said sets represents the number of said received data transitions which occurred during the data sequence at said selected time difference range associated with said particular set.

22. The apparatus of claim 21 wherein said processor means produces said figure of merit value as a function of the ratio of the sum of the squares of said deviation data to the square of the sums of said deviation data in accordance with the following equation:

$$SNRE = SNRE \left[ \frac{\sum_{n=1}^{M} [DCNT(n)]^2}{\left[ \sum_{n=1}^{M} DCNT(n) \right]^2} \right]$$

where
SNRE represents the magnitude of said figure of merit value;
M represents the number of said sets of said deviation data;
n is an index; and
DCNT(n) represents said deviation data of said M number of said deviation data sets.

23. The apparatus of claim 21 wherein said referece means further includes frequency divider means for dividing the frequency of said phase coherent signal.

24. The apparatus of claim 23 wherein said frequency divider means includes a counter having a plurality of counter outputs.

25. The apparatus of claim 24 wherein said reference means further includes decoder means for producing said reference signals utilizing counter signals present at said counter outputs.

26. The apparatus of claim 25 wherein said frequency divider means provides N number of said reference signals during each of the baseband data periods and wherein said deviation means produces M number of said sets of said deviation data for each of said data sequences.

27. The apparatus of claim 26 wherein said number N is greater than said number M.

28. The apparatus of claim 27 wherein said reference means includes latch circuit means for storing reference data which corresponds to said N number of reference signals at times determined by said transition signals.

* * * * *

UNITED STATES PATENT AND TRADEMARK OFFICE
CERTIFICATE OF CORRECTION

PATENT NO. : 4,688,234

DATED : August 18, 1987

INVENTOR(S): Michael A. Robinton

It is certified that error appears in the above - identified patent and that said Letters Patent is hereby corrected as shown below:

At column 2, line 7, delete "fiqure" and insert --figure-- in lieu thereof.

At column 3, line 18, delete "an" and insert --a-- in lieu thereof.

At column 3, line 37, delete "deivation" and insert --deviation-- in lieu thereof.

At column 4, line 33, after "data" insert --.--.

At column 5, line 64, delete "is".

At column 9, line 10, delete "messaue" and insert --message-- in lieu thereof.

At column 9, line 48, delete "fiqure" and insert --figure-- in lieu thereof.

At column 9, line 61, delete the first occurrence of "at least".

At column 10, line 59, delete "represent" and insert --represents-- in lieu thereof.

At column 11, line 19, delete "appartus" and insert --apparatus-- in lieu thereof.

At column 12, line 34, delete "singal-to-" and insert --signal-to-" in lieu thereof.

UNITED STATES PATENT AND TRADEMARK OFFICE
CERTIFICATE OF CORRECTION

PATENT NO. : 4,688,234                                   Page 2 of 3

DATED      : August 18, 1987

INVENTOR(S): Michael A. Robinton

It is certified that error appears in the above - identified patent and that said Letters Patent is hereby corrected as shown below:

At column 12, lines 50-63, delete "deviation means responsive to said transition signals and said reference signals for providing deviation data indicative of the magnitude of the time defference between said data transitions and data are allocated among a plurality of sets for each of the data sequences, with each of said sets containing deviation data indicative of a selected range of said time difference magnitudes wherein said deviation data of a particular one of said sets represents the number of said received data transitions which occurred during the data sequence at said selected time difference range associated with said particular set; and" and insert --deviation means responsive to said transition signals and said reference signals for providing deviation data indicative of the magnitude of the time difference between said data transitions and said epoch time points, wherein said deviation data are allocated among a plurality of sets for each of the data sequences, with each of said sets containing deviation data indicative of a selected range of said time difference magnitudes wherein said deviation data of a particular one of said sets represents the number of said received data transitions which occurred during the data sequence at said selected time difference range associated with said particular set; and--.

At column 14, line 2, delete "sAid" and insert --said-- in lieu thereof.

At column 14, line 13, delete "signal" and insert --signals-- in lieu thereof.

At column 14, line 24, after "with" insert --the--.

At column 14, lines 38 and 40, delete "DCNT(n)
n is an index; and represents said deviation data of said M number of said deviation data sets" and insert in lieu thereof

UNITED STATES PATENT AND TRADEMARK OFFICE
CERTIFICATE OF CORRECTION

PATENT NO. : 4,688,234

DATED : August 18, 1987

INVENTOR(S) : Michael A. Robinton

It is certified that error appears in the above - identified patent and that said Letters Patent is hereby corrected as shown below:

--n is an index; and
 DCNT(n) represents said deviation data of said M number of said deviation data sets.--.

At column 15, line 29, delete "mans" and insert --means-- in lieu thereof.

At column 15, line 33, delete "mans" and insert --means-- in lieu thereof.

At column 15, line 37, delete "eposh" and insert --epoch-- in lieu thereof.

At column 15, line 47, delete "reeeived" and insert --received-- in lieu thereof.

At column 16, line 30, delete "referece" and insert --reference-- in lieu thereof.

Signed and Sealed this

Thirtieth Day of August, 1988

*Attest:*

DONALD J. QUIGG

*Attesting Officer*  *Commissioner of Patents and Trademarks*